United States Patent
Tak

(10) Patent No.: US 7,847,906 B2
(45) Date of Patent: Dec. 7, 2010

(54) LIQUID CRYSTAL DISPLAY

(75) Inventor: Young-Mi Tak, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/902,215

(22) Filed: Jul. 29, 2004

(65) Prior Publication Data
US 2005/0024572 A1     Feb. 3, 2005

(30) Foreign Application Priority Data
Jul. 31, 2003     (KR) .................. 10-2003-0053048

(51) Int. Cl.
    *G02F 1/1343*   (2006.01)
(52) U.S. Cl. ................................. 349/143; 349/141
(58) Field of Classification Search .............. 349/146
    See application file for complete search history.

(56) References Cited

U.S. PATENT DOCUMENTS

| 5,040,875 | A  | * | 8/1991  | Noguchi ............... | 349/143 |
| 6,661,488 | B1 | * | 12/2003 | Takeda et al. ......... | 349/117 |
| 2001/0004277 | A1 | * | 6/2001 | Koma ................... | 349/143 |
| 2001/0007487 | A1 | * | 7/2001 | Yoon et al. ........... | 349/106 |
| 2001/0019389 | A1 | * | 9/2001 | Lee et al. ............. | 349/129 |
| 2002/0097364 | A1 | * | 7/2002 | kwon et al. ........... | 349/139 |
| 2002/0140892 | A1 | * | 10/2002 | Baek et al. ........... | 349/141 |
| 2004/0119924 | A1 |   | 6/2004 | Takeda et al. | |
| 2005/0030459 | A1 | * | 2/2005 | Song et al. ........... | 349/129 |

FOREIGN PATENT DOCUMENTS

| CN | 1211745 | 3/1999 |
|---|---|---|
| CN | 1420383 | 5/2003 |
| CN | 1432855 | 7/2003 |
| JP | 02-033031 U | 3/1990 |
| JP | 03-242625 A | 10/1991 |
| JP | 06-118447 A | 4/1994 |
| JP | 06-202145 A | 7/1994 |
| JP | 07-092489 A | 4/1995 |
| JP | 07-311392 A | 11/1995 |
| JP | 2001-109018 A | 4/2001 |
| JP | 2001-194671 A | 7/2001 |
| JP | 2003-186029 A | 7/2003 |
| JP | 2004-213011 A | 7/2004 |
| JP | 2004-361946 A | 12/2004 |
| KR | 1999-006951 A | 1/1999 |
| KR | 1019990026575 A | 4/1999 |
| KR | 1020000004420 A | 1/2000 |
| KR | 1020030046918 A | 6/2003 |

OTHER PUBLICATIONS

Chinese Office Action; 200410070486; Jul. 27, 2007.
English Translation of Chinese Office Action; 200410070418.6; Jul. 27, 2007.

* cited by examiner

*Primary Examiner*—David Nelms
*Assistant Examiner*—Lucy P Chien
(74) *Attorney, Agent, or Firm*—Cantor Colburn LLP

(57) ABSTRACT

A liquid crystal display is provided, which includes: a first substrate; a first signal line formed on the first substrate and extending in a first direction; a second signal line formed on the first substrate, intersecting the first signal line, and including a curved portion and a rectilinear portion connected to the curved portion; a first thin film transistor connected to the first signal line and the second signal line; a pixel electrode connected to the first thin film transistor; a second substrate facing the second substrate; and a common electrode formed on the second substrate and having an opening facing the second signal line.

14 Claims, 13 Drawing Sheets

LIQUID CRYSTAL DISPLAY

BACKGROUND OF THE INVENTION (a) Field of the Invention

The present invention relates to a liquid crystal display.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the viewing angle is widened. In particular, a patterned VA (PVA) mode LCD employing the cutouts is preferred as a substitute of an in-plane switching (IPS) mode LCD.

The PVA mode LCD has a fast response time compared with a twisted nematic (TN) mode LCD since the motions of the LC molecules only include elastic splay or bend without twist.

In the meantime, the LCD also includes a plurality of switching elements for applying voltages to the field-generating electrodes and a plurality of signal lines such as gate lines and data lines connected to the switching elements. The signal lines make capacitive coupling with other signal lines and the common electrode, which serves as a load exerted on the signal lines to yield signal delay as well as their own resistances. In particular, the coupling between the data lines and the common electrode drives liquid crystal molecules disposed therebetween to cause light leakage near the data lines, thereby deteriorating the light leakage. In order to prevent the light leakage, a black matrix may be wide to reduce the aperture ratio.

SUMMARY OF THE INVENTION

A motivation of the present invention is to solve problems of the conventional art.

A liquid crystal display is provided, which includes: a first substrate; a first signal line formed on the first substrate and extending in a first direction; a second signal line formed on the first substrate, intersecting the first signal line, and including a curved portion and a rectilinear portion connected to the curved portion; a first thin film transistor connected to the first signal line and the second signal line; a pixel electrode connected to the first thin film transistor; a second substrate facing the second substrate; and a common electrode formed on the second substrate and having an opening facing the second signal line.

The liquid crystal display may further include a third signal line overlapping the pixel electrode, extending substantially parallel to the first signal line, and separated from the first signal line. The third signal line may include a first curved branch extending substantially parallel to the curved portion of the second signal line.

The pixel electrode may include at least two sub-pixel electrodes and at least one of the sub-pixel electrodes is connected to the first thin film transistor.

The sub-pixel electrodes may include first and second sub-pixel electrodes disposed opposite each other with respect to the second signal line.

The liquid crystal display may further include a second thin film transistor connected to the first and the second signal lines and the second sub-pixel electrode, wherein the firs sub-pixel electrode is connected to the first thin film transistor.

The third signal line may further include a second curved branch extending substantially parallel to the curved portion of the second signal line, wherein the first and the second branches of the third signal line are disposed opposite each other with respect to the second signal line.

The first and the second branches of the third signal line may overlap the first and the second sub-pixel electrodes, respectively, and in particular, the first and the second sub-pixel electrodes may include edges disposed on the first and the second curved branches of the third signal line, respectively.

The opening may have an edge disposed between an edge of the second signal line and an edge of the first or the second branch of the third signal line adjacent thereto.

The first and the second sub-pixel electrodes may be connected to each other.

The pixel electrode may further include a pixel connection connecting the first and the second sub-pixel electrodes and intersecting the curved portion of the second signal line.

The thin film transistor may include a terminal connected to the pixel electrode and overlapping the third signal line.

The curved portion of the second signal line may include at least two rectilinear portions alternately making clockwise and counterclockwise angles of about 45 degrees.

The liquid crystal display may further include a tilt direction determining member disposed on the first or the second substrate and including a curved portion.

The tilt direction determining member may include a cutout provided at the pixel electrode or the common electrode, or a protrusion provided on the pixel electrode or the common electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
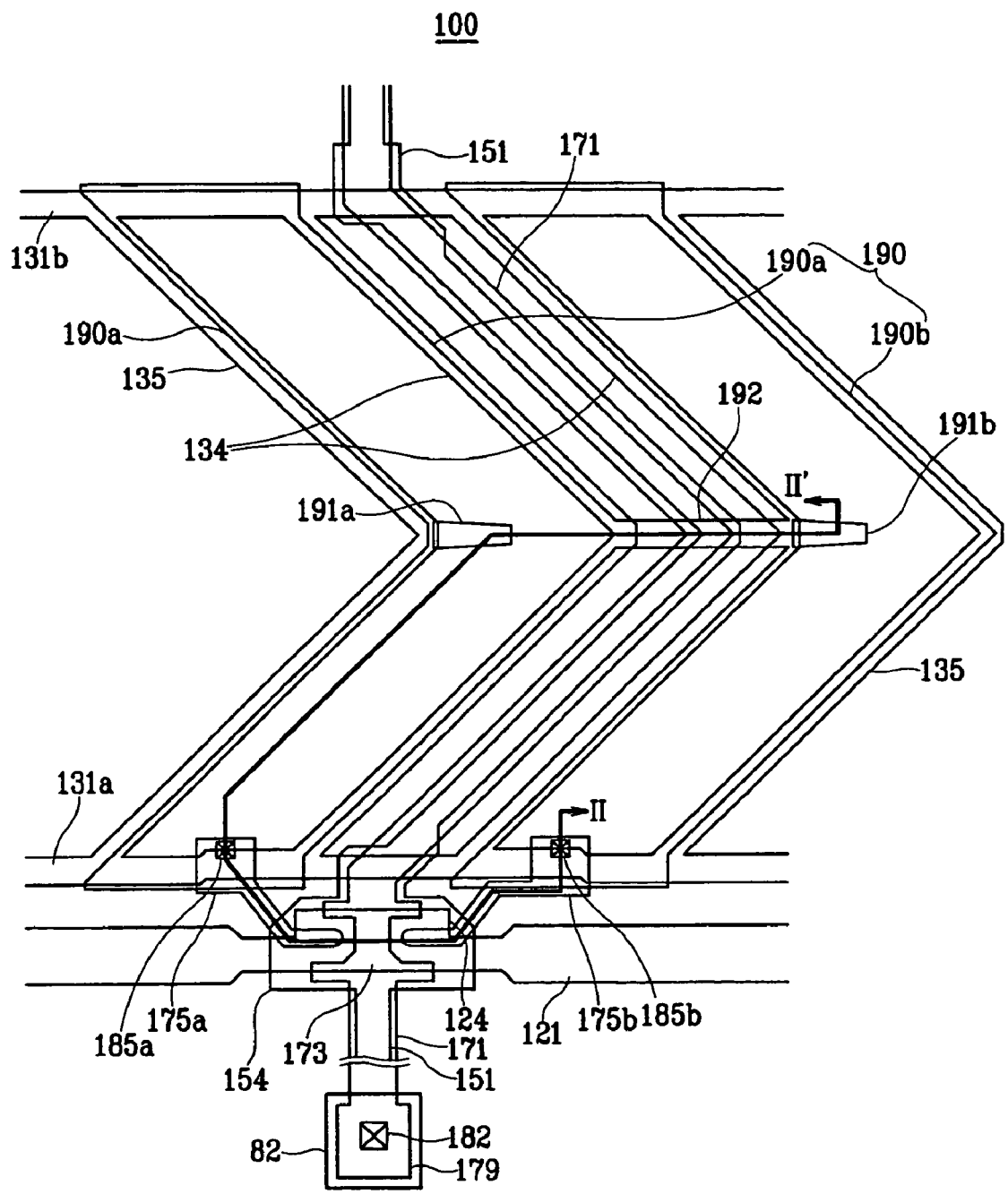
FIG. 1 is a layout view of a TFT array panel for an LCD according to an embodiment of the present invention.

The present invention now will be described more fully hereinafter with reference to the accompanying drawings, in which embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

An LCD according to an embodiment of the present invention is described in detail with reference to FIGS. 1-6.

Figure 2:
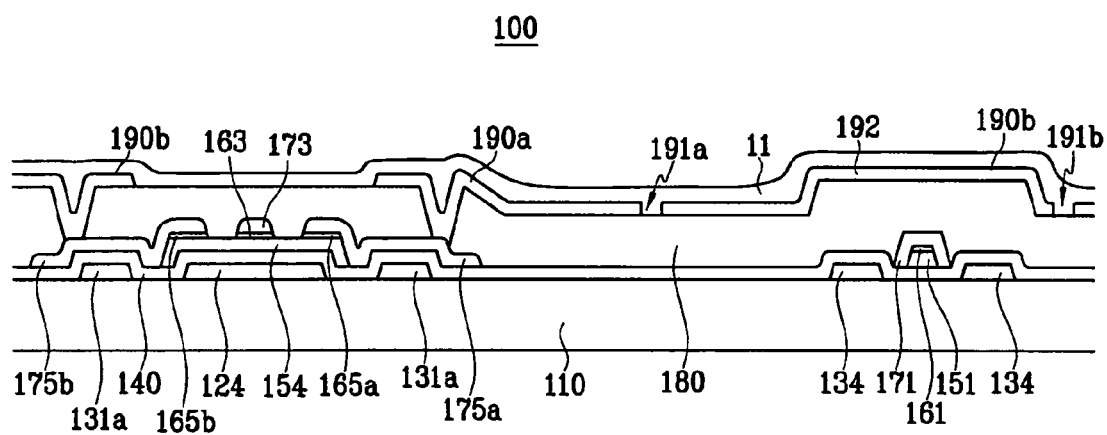
FIG. 2 is a sectional view of the TFT array panel shown in FIG. 1 taken along the line II-II'.
Figure 3:
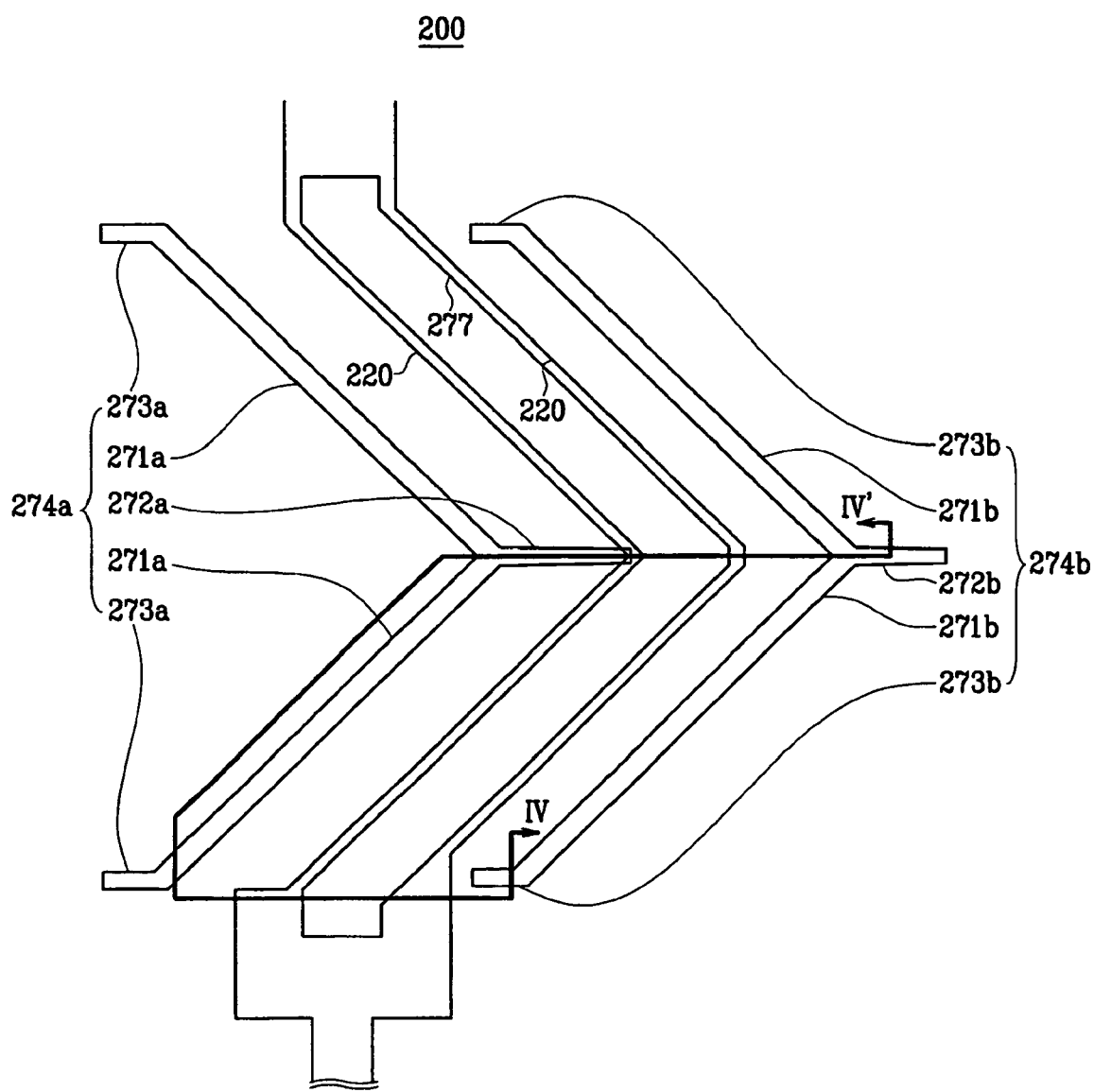
FIG. 3 is a layout view of a common electrode panel for an LCD according to an embodiment of the present invention.
Figure 4:
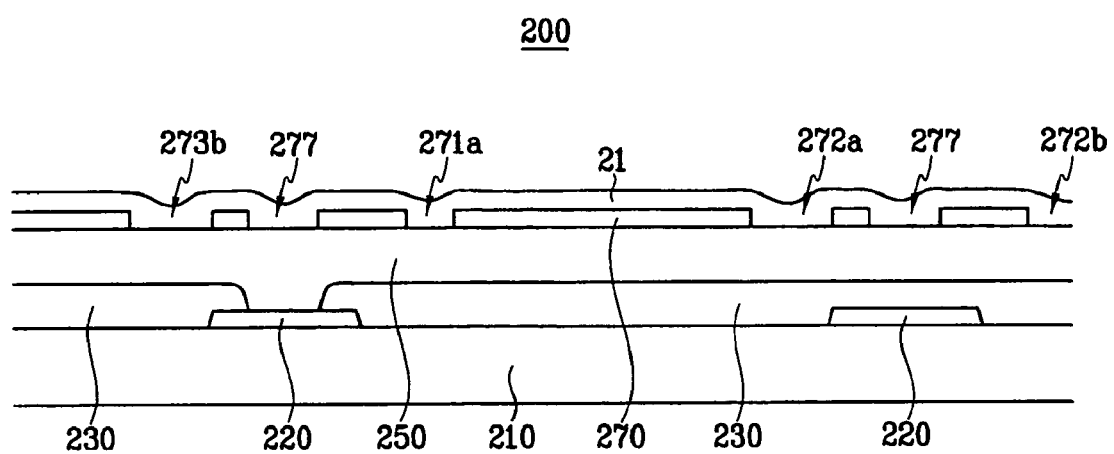
FIG. 4 is a sectional view of the common electrode panel shown in FIG. 3 taken along the line IV-IV'.
Figure 5:
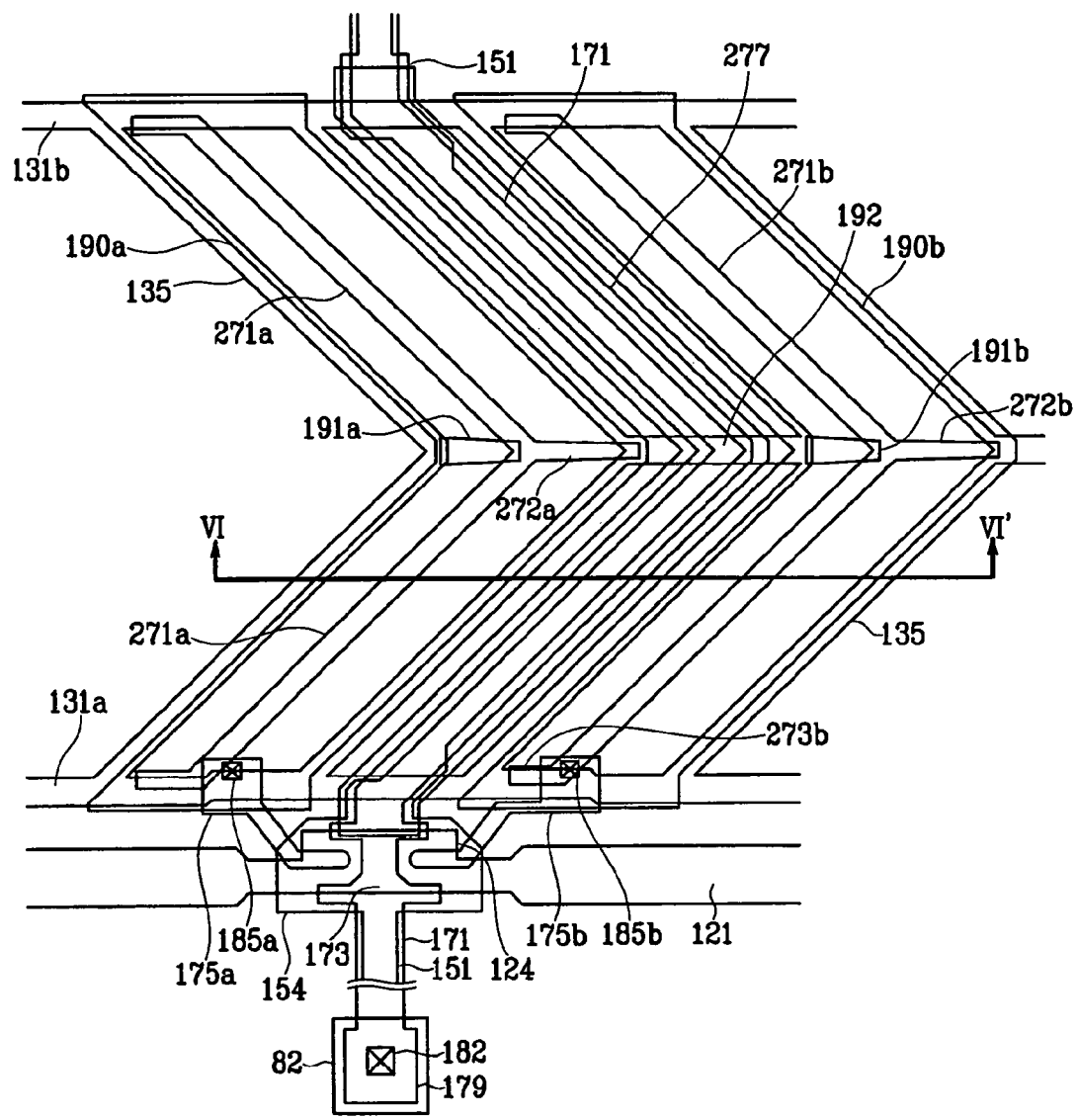
FIG. 5 is a layout view of an LCD including the TFT array panel shown in FIGS. 1 and 2 and the common electrode panel shown in FIGS. 3 and 4.
Figure 6:
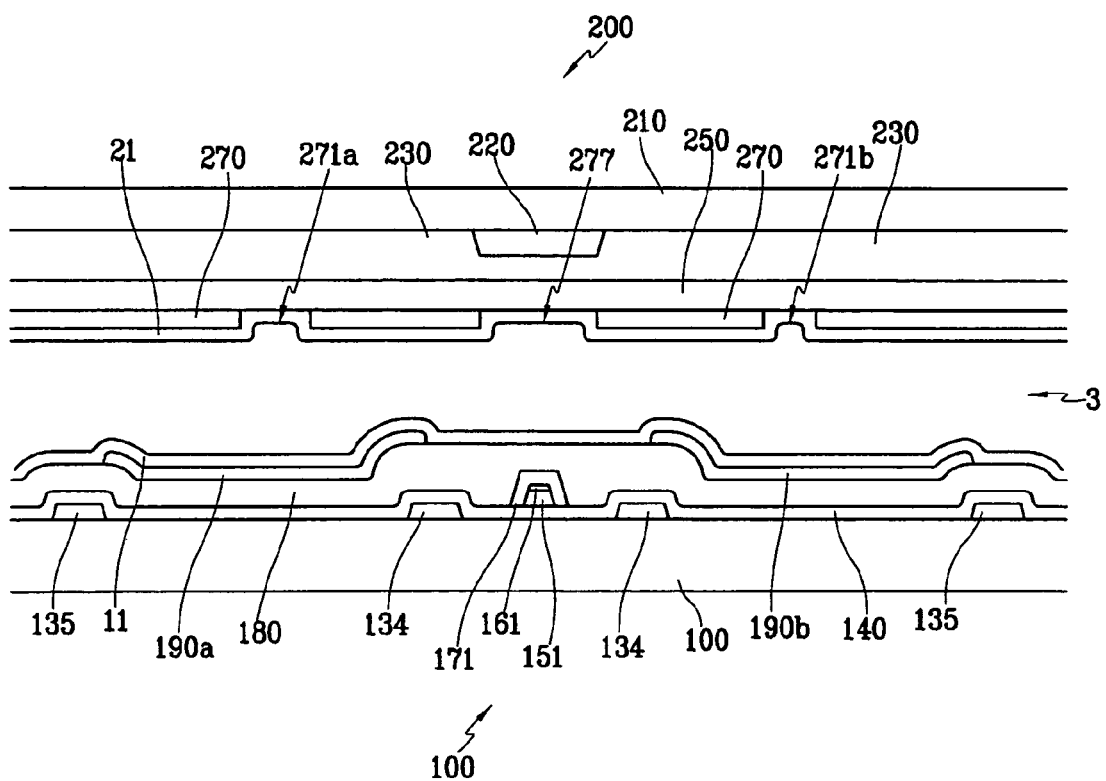
FIG. 6 is a sectional view of the LCD shown in FIG. 5 taken along the line VI-VI'.

FIG. 1 is a layout view of a TFT array panel for an LCD according to an embodiment of the present invention, FIG. 2 is a sectional view of the TFT array panel shown in FIG. 1 taken along the line II-II', FIG. 3 is a layout view of a common electrode panel for an LCD according to an embodiment of the present invention, FIG. 4 is a sectional view of the common electrode panel shown in FIG. 3 taken along the line IV-IV', FIG. 5 is a layout view of an LCD including the TFT array panel shown in FIGS. 1 and 2 and the common electrode panel shown in FIGS. 3 and 4, and FIG. 6 is a sectional view of the LCD shown in FIG. 5 taken along the line VI-VI'.

An LCD according to an embodiment of the present invention includes a TFT array panel 100, a common electrode panel 200 facing the TFT array panel 100, and a LC layer 3 interposed between the TFT array panel 100 and the common electrode panel 200.

The TFT array panel 100 is now described in detail with reference to FIGS. 1, 2, 5 and 6.

A plurality of gate lines 121 and a plurality of pairs of storage electrode lines 131a and 131b are formed on an insulating substrate 110.

The gate lines 121 for transmitting gate signals extend substantially in a transverse direction and are separated from each other. Each gate line 121 includes a plurality of projections forming a plurality of gate electrodes 124. The gate lines 121 may extend to be connected to a driving circuit (not shown) integrated on the substrate 110, or it may have an end portion (not shown) having a large area for connection with another layer or an external driving circuit mounted on the substrate 110 or on another device such as a flexible printed circuit film (not shown) that may be attached to the substrate 110.

The storage electrode lines 131a and 131b extend substantially in the transverse direction, and they are curved near the gate electrodes 124. Each pair of the storage electrode lines 131a and 131b are disposed between adjacent two gate lines 121 and close to respective gate lines 121, and they include a plurality of two pairs of inner and outer storage electrodes 134 and 135 that are connected thereto and extend parallel to each other. Each storage electrode 134 or 135 is once curved with a substantially right angle such that it includes a pair of oblique portions making clockwise and counterclockwise angles of about 45 degrees with the gate lines 121 and connected to each other with a substantially right angle. The distance between the inner storage electrodes 134 is smaller than the distance between the inner storage electrode 134 and the outer storage electrode 135. Accordingly, each of the two pairs of the inner and outer storage electrodes 134 and 135 define a wide chevron-like area, while a pair of the inner storage electrodes 134 define a narrow chevron-like area that is interposed between a pair of wide chevron-like areas and has transverse edges facing the gate electrodes 124. The storage electrode lines 131a and 131b are supplied with a predetermined voltage such as a common voltage, which is applied to a common electrode 270 on the common electrode panel 200 of the LCD.

The gate lines 121 and the storage electrode lines 131a and 131b are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two films having different physical characteristics. One of the two films is preferably made of low resistivity metal including Al containing metal, Ag containing metal, or Cu containing metal for reducing signal delay or voltage drop in the gate lines 121 and the storage electrode lines 131a and 131b. On the other hand, the other film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the two film materials is Cr and Al—Nd alloy.

In addition, the lateral sides of the gate lines 121 and the storage electrode lines 131a and 131b are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131a and 131b.

A plurality of semiconductor stripes 151 preferably made of hydrogenated amorphous silicon (abbreviated as "a-Si") or polysilicon are formed on the gate insulating layer 140. Each semiconductor stripe 151 extends substantially parallel to the storage electrodes 134 and 135 such that it is curved periodically. In addition, each semiconductor stripe 151 intersects the gate lines 121 and the storage electrode lines 131a and 131b such that it passes through the gate electrodes 124 and the above-described narrow chevron-like areas defined by the inner storage electrodes 134. Each semiconductor stripe 151 has a plurality of projections 154 projecting left and right on the gate electrodes 124 and covering the gate electrodes 124 and the width of each semiconductor stripe 151 becomes large near the gate lines 121 and the storage electrode lines 131a and 131b such that the semiconductor stripe 151 covers large areas of the gate lines 121 and the storage electrode lines 131a and 131b.

A plurality of ohmic contact stripes and islands 161, 165a and 165b preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165a and 165b are located in pairs on the projections 154 of the semiconductor stripes 151.

The lateral sides of the semiconductor stripes 151 and the ohmic contacts 161, 165a and 165b are inclined relative to the surface of the substrate 110, and the inclination angles thereof are preferably in a range of about 30-80 degrees.

A plurality of data lines 171 and a plurality of pairs of drain electrodes 175a and 175b separated from each other are formed on the ohmic contacts 161, 165a and 165b and the gate insulating layer 140.

The data lines 171 for transmitting data voltages extend substantially in the longitudinal direction along the semiconductor stripes 151 and thus they intersect the gate lines 121 and the storage electrode lines 131a and 131b such that it passes through the gate electrodes 124 and the above-described narrow chevron-like areas defined by the inner storage electrodes 134. Accordingly, each data line 171 curves periodically and includes a plurality of curved portions and a plurality of longitudinal portions arranged alternately. Each curved portion includes a pair of oblique portions connected to each other and opposite ends of the pair of oblique portions are connected to respective longitudinal portions. The oblique portions of the data lines 171 make clockwise and counterclockwise angles of about 45 degrees with the gate lines 121, and the longitudinal portions cross over the gate electrodes 124. The length of a curved portion is about one to nine times the length of a longitudinal portion, that is, it occupies about 50-90 percents of the total length of the curved portion and the longitudinal portion. A curved portion may include three or more oblique portions such that it are curved twice or more.

Each data line 171 has an end portion 179 having a large area for contact with another layer or an external device.

A pair of the drain electrodes 175a or 175b are disposed opposite with respect to a longitudinal portion of a data line 171 and obliquely extend in upper left and upper right directions, respectively, from linear end portions disposed near a gate electrode 124 to rectangular expanded end portions. The expanded end portions of the drain electrodes 175a and 175b have a large area for contact with another layer and overlap the storage electrode lines 131a. Each longitudinal portion of the data lines 171 includes a plurality of projections projecting left and right such that the longitudinal portion including the projections forms a source electrode 173 partly enclosing linear end portions of a pair of drain electrodes 175a and 175b. Each set of a gate electrode 124, a source electrode 173, and a pair of drain electrodes 175a and 175b along with a projection 154 of a semiconductor stripe 151 form a pair of TFTs having respective channels formed in the semiconductor projection 154 that is disposed between the source electrode 173 and the drain electrodes 175a and 175b.

The data lines 171 and the drain electrodes 175a and 175b are preferably made of refractory metal such as Cr, Mo, Mo alloy, Ta and Ti. They may also include a lower film (not shown) preferably made of Mo, Mo alloy or Cr and an upper film (not shown) located thereon and preferably made of Al containing metal.

Like the gate lines 121 and the storage electrode lines 131a and 131b, the data lines 171 and the drain electrodes 175a and 175b have inclined lateral sides, and the inclination angles thereof range about 30-80 degrees.

The ohmic contacts 161, 165a and 165b are interposed only between the underlying semiconductor stripes 151 and the overlying data lines 171 and the overlying drain electrodes 175a and 175b thereon and reduce the contact resistance therebetween. The semiconductor stripes 151 include a plurality of exposed portions, which are not covered with the data lines 171 and the drain electrodes 175a and 175b, such as portions located between the source electrodes 173 and the drain electrodes 175a and 175b. Although the semiconductor stripes 151 are narrower than the data lines 171 at most places, the width of the semiconductor stripes 151 becomes large near the gate lines 121 and the storage electrode lines 131a and 131b as described above, to smooth the profile of the surface, thereby preventing the disconnection of the data lines 171.

A passivation layer 180 is formed on the data lines 171 and the drain electrodes 175a and 175b, and exposed portions of the semiconductor stripes 151, which are not covered with the data lines 171 and the drain electrodes 175a and 175b. The passivation layer 180 is preferably made of low dielectric insulating material such as a-Si:C:O and a-Si:O:F formed by plasma enhanced chemical vapor deposition (PECVD) or inorganic insulator such as silicon nitride and silicon oxide. The passivation layer 180 may have a double-layered structure including a lower inorganic film and an upper organic film in order to prevent the channel portions of the semiconductor stripes 151 from being in direct contact with organic material.

The passivation layer 180 has a plurality of contact holes 182, 185a and 185b exposing the end portions 179 of the data lines 171 and the drain electrodes 175a and 175b, respectively. The contact holes 182, 185a and 185b can have various shapes such as polygon or circle and the area of each contact hole 182 is preferably equal to or larger than 0.5 mm×15 μm and not larger than 2 mm×60 μm. The sidewalls of the contact holes 182, 185a and 185b are inclined with an angle of about 30-80 degrees or have stepwise profiles.

A plurality of pixel electrodes 190 and a plurality of contact assistants 82, which are preferably made of ITO or IZO, are formed on the passivation layer 180.

Each pixel electrode 190 includes a pair of sub-pixel electrodes 190a and 190b that are disposed opposite each other with respect to a data line 171 and connected through a pixel connection 192. This configuration makes the parasitic capacitance between the data line 171 and the pixel electrode 190 constant regardless of their alignment, thereby preventing stitch defects due to the difference in the order of alignments between adjacent shots in a divisional exposure process.

Each sub-pixel electrode 190a or 190b is located substantially in a chevron-like area enclosed by the data lines 171 and the gate lines 121 or by a pair of the inner and outer storage electrodes 134 and 135, and therefore, it has a shape of a chevron having a pair of transverse edges, which extend substantially parallel to the gate lines 121, and a pair of curved edges, which extend substantially parallel to the data lines 171. The curved edges include a convex edge having a convex vertex and a concave edge having a concave vertex, and a diagonal from the convex vertex to the concave vertex is substantially parallel to the gate lines 121. The convex edge of the sub-pixel electrode 190a is adjacent to the concave edge of the sub-pixel electrode 190b and the pixel connection 192 connects the convex vertex of the sub-pixel electrode 190a to the convex vertex of the sub-pixel electrode 190b with crossing over the data line 171. The distance between the sub-pixel electrodes 190a and 190b may be reduced in order to increase the aperture ratio and the pixel connection 192 may be formed of another layer different from the data lines 171.

The sub-pixel electrodes 190a and 190b cover the storage electrode lines 131a and 131b including the storage electrodes 134 and 135 and the expansions of the drain electrodes 175a and 175b and the curved edges of the sub-pixel electrodes 190a and 190b are placed on the storage electrodes 134 and 135. Therefore, the sub-pixel electrodes 190a and 190b do not overlap the data lines 171 and the inner storage electrodes 134 are disposed between the data line 171 and the sub-pixel electrodes 190a and 190b. This reduces the parasitic capacitance between the data line 171 and the pixel electrodes 190 to reduce the distortion of the voltages of the pixel electrodes 190, thereby preventing spots.

In addition, each sub-pixel electrode 190a/190b has a cutout 191a/191b that is disposed nearly in a left half of the sub-pixel electrode 190a/190b and extends substantially from the concave vertex of the convex edge along the transverse direction.

The sub-pixel electrodes 190a and 190b are physically and electrically connected to the drain electrodes 175a and 175b through the contact holes 185a and 185b, respectively, such that the sub-pixel electrodes 190a and 190b receive the data voltages from the drain electrodes 175a and 175b, respectively. The sub-pixel electrodes 190 supplied with the data voltages generate electric fields in cooperation with the common electrode 270, which reorient liquid crystal molecules disposed therebetween.

A sub-pixel electrode 190a/190b and the common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the sub-pixel electrodes 190a/190b and the expansions of the drain electrodes 175a and 175b with the storage electrode lines 131a and 131b including the storage electrodes 134 and 135. The capacitances of the storage capacitors, i.e., the storage capacitances may be increased by providing expansions (not shown) at the storage electrode lines 131a overlapping the drain electrodes 175a and 175b for increasing overlapping areas. The expansions of the storage electrode lines 131a may have a shape of parallelogram or diamond, etc., depending on the shape of the sub-pixel electrodes 190a and 190b.

The sub-pixel electrodes 190a and 190b do not overlap the data lines 171 for reducing the parasitic capacitance therebetween.

The contact assistants 82 are connected to the exposed end portions 179 of the data lines 171 through the contact holes 182. The contact assistants 82 protect the exposed end portions 179 and complement the adhesion between the exposed end portions 179 and external devices. The contact assistants 82 may be omitted when the end portions 179 are omitted.

Finally, a homeotropic alignment layer 11 is formed on the pixel electrodes 190, the contact assistants 82, and the passivation layer 180.

The description of the common electrode panel 200 follows with reference to FIGS. 3-6.

A light blocking member 220 called a black matrix is formed on an insulating substrate 210 such as transparent glass and it includes a plurality of curved portions facing the curved portions of the data lines 171 and a plurality of expanded portions facing the TFTs and the longitudinal portions of the data lines 171 such that the light blocking member 220 prevents light leakage between the pixel electrodes 190 and defines open areas facing the pixel electrodes 190.

A plurality of color filters 230 are formed on the substrate 210 and the light blocking member 220 and it is disposed substantially in the open areas defined by the light blocking member 220. The color filters 230 disposed in adjacent two data lines 171 and arranged in the longitudinal direction may be connected to each other to form a stripe. Each color filter 230 may represent one of three primary colors such as red, green and blue colors. The color filters 230 may be disposed on the TFT array panel 100, and in this case, they may be disposed under the gate insulating layer 140 or under the passivation layer 180.

An overcoat 250 preferably made of silicon nitride or organic material is formed on the color filters 230 and the light blocking member 220. The overcoat 250 protects the color filters 230 and gives a flat top surface.

A common electrode 270 preferably made of transparent conductive material such as ITO and IZO is formed on the overcoat 250. The common electrode 270 is supplied with the common voltage and it has a plurality of pairs of chevron-like cutouts 274a and 274b facing respective sub-pixel electrodes 190a and 190b and a plurality of openings 277.

The cutout 274a/274b includes a curved portion 271a/271b having a curve point, a center transverse portion 272a/272b connected to the curve point of the curved portion 271a/271b, and a pair of terminal transverse portions 273a/273b connected to respective ends of the curved portion 271a/271b. The curved portion 271a/271b of the cutout 274a/274b extends substantially parallel to the data lines 171 and it bisects the sub-pixel electrode 190a/190b into left and right halves. The center transverse portion 272a/272b makes an obtuse angle with the oblique portions 271a/271b and extends approximately from an end of a cutout 191a/191b of a sub-pixel electrode 190a/190b approximately to the convex vertex of the subpixel electrode 190a/190b. The terminal transverse portions 273a/273b are aligned with transverse edges of the sub-pixel electrode 190a/190b, respectively, and they make obtuse angles with the oblique portions 271a/271b. The cutout 274a/274b preferably has a width in a range of about 9-12 microns.

The openings 277 face the data lines 171 for reducing the parasitic capacitance between the common electrode 270 and the data lines 171, thereby reducing the signal delay in the data lines 171 and the light leakage near the data lines 171. However, no opening is disposed on the gate lines 121 for signal paths of the common voltage. Edges of the openings 277 are disposed between adjacent edges of the data lines 171 and the inner storage electrodes 134 such that the common electrode 270 fully covers the storage electrodes 134 and 135. Although the openings 277 are curved, they do not block the current of the common electrode 270 in the longitudinal direction since the current path also follows the shape of the sub-pixel electrodes 190a and 190b.

The light blocking member 220 may also overlap the cutouts 274a and 274b to block the light leakage through the cutouts 274a and 274b.

A homeotropic alignment layer 21 is coated on the common electrode 270.

The alignment layers 11 and 21 may be homogeneous alignment layers.

A pair of polarizers (not shown) are provided on outer surfaces of the panels 100 and 200 such that their transmissive axes are crossed and one of the transmissive axes is parallel to the gate lines 121. In addition, at least a retardation film (not shown) for compensating the retardation of the LC layer 3 may be disposed between the polarizers and the outer surfaces of the panels 100 and 200.

The LCD may further include a backlight unit for providing light for the LCD.

The LC layer 3 has negative dielectric anisotropy and the LC molecules in the LC layer 3 are aligned such that their long axes are vertical to the surfaces of the panels 100 and 200 in absence of electric field.

Upon application of the common voltage to the common electrode 270 and a data voltage to the sub-pixel electrodes 190a and 190b, a primary electric field substantially perpendicular to the surfaces of the panels 100 and 200 is generated. The LC molecules tend to change their orientations in response to the electric field such that their long axes are perpendicular to the field direction. In the meantime, the cutouts 274a and 274b of the common electrode 270 and the edges of the sub-pixel electrodes 190a and 190b distort the primary electric field to have a horizontal component which determines the tilt directions of the LC molecules. The horizontal component of the primary electric field is perpendicular to the edges of the cutouts 274a and 274b and the edges of the sub-pixel electrodes 190a and 190b.

Accordingly, four sub-regions having different tilt directions, which are partitioned by edges of a sub-pixel electrode 190a/190b, a cutout 274a/274b bisecting the sub-pixel electrode 190a/190b, and a transverse cutout 191a/191b, are formed in a sub-pixel region of the LC layer 3, which are located on the sub-pixel electrode 190a/190b. Each sub-region has two major edges defined by the cutout 274a/274b and an oblique edge of the sub-pixel electrode 190a/190b, respectively. The sub-regions are classified into a plurality of, preferably four, domains based on the tilt directions.

The horizontal component of the primary electric field is enhanced by the exposed portions of the storage electrodes 134 and 135 that are supplied with the common voltage.

In the meantime, the direction of a secondary electric field due to the voltage difference between the pixel electrodes 190 is perpendicular to the edges of the pixel electrodes and the cutouts 274a and 274b. Accordingly, the field direction of the secondary electric field coincides with that of the horizontal component of the primary electric field in the domains. Consequently, the secondary electric field between the pixel electrodes 190 enhances the determination of the tilt directions of the LC molecules in the domains.

Since the LCD performs inversion such as dot inversion, column inversion, etc., adjacent pixel electrodes 190 are supplied with data voltages having opposite polarity with respect to the common voltage and thus a secondary electric field between the adjacent pixel electrodes 190 is almost always generated to enhance the stability of the primary domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The number, shapes, and arrangements of the cutouts 191a, 191b, 274a and 274b and the openings 277 may be modified depending on the design factors. Moreover, the cutouts 191a, 191b, 274a and 274b may be substituted with protrusions, preferably made of organic material, and preferably having width ranging about 5-10 microns.

A method of manufacturing the TFT array panel shown in FIGS. 1-6 according to an embodiment of the present invention will be now described in detail.

A plurality of gate lines 121 including a plurality of gate electrodes 124 and a plurality of storage electrode lines 131 including a plurality of storage electrodes 134 and 135 are formed on an insulating substrate 110 such as transparent glass.

When the gate lines 121 and the storage electrode lines 131 have a double-layered structure including a lower conductive film and an upper conductive film, the lower conductive film is preferably made of material such as Mo or Cr alloy having good physical and chemical characteristics and the upper conductive film is preferably made of Al or Al containing metal.

After sequential deposition of a gate insulating layer 140 with thickness of about 1,500-5,000 Å, an intrinsic a-Si layer with thickness of about 500-2,000 Å, and an extrinsic a-Si layer with thickness of about 300-600 Å, the extrinsic a-Si layer and the intrinsic a-Si layer are photo-etched to form a plurality of extrinsic semiconductor stripes and a plurality of intrinsic semiconductor stripes 151 on the gate insulating layer 140.

Subsequently, a plurality of date lines 171 including a plurality of source electrodes 173 and a plurality of drain electrodes 175a and 175b are formed. The data lines 171 and the drain electrodes 175a and 175b may also have a double-layered structure including a lower conductive film and an upper conductive film, the lower conductive film is preferably made of material such as Mo or Cr alloy having good physical and chemical characteristics and the upper conductive film is preferably made of Al or Al containing metal.

Thereafter, portions of the extrinsic semiconductor stripes, which are not covered with the data lines 171 and the drain electrodes 175a and 175b, are removed to complete a plurality of ohmic contact stripes and islands 161, 165a and 165b and to expose portions of the intrinsic semiconductor stripes 151. Oxygen plasma treatment preferably follows thereafter in order to stabilize the exposed surfaces of the semiconductor stripes 151.

After depositing a passivation layer 180, the passivation layer 180 and the gate insulating layer 140 are patterned to form a plurality of contact holes 182, 185a and 185b exposing end portions 179 of the data lines 171 and the drain electrodes 175a and 175b, respectively.

Finally, a plurality of pixel electrodes 190 and a plurality of contact assistants 82 are formed on the passivation layer 180 by sputtering and photo-etching IZO or ITO layer with thickness of about 400-500 Å.

An LCD according to another embodiment of the present invention will be described in detail with reference to FIGS. 7-10.

Figure 7:
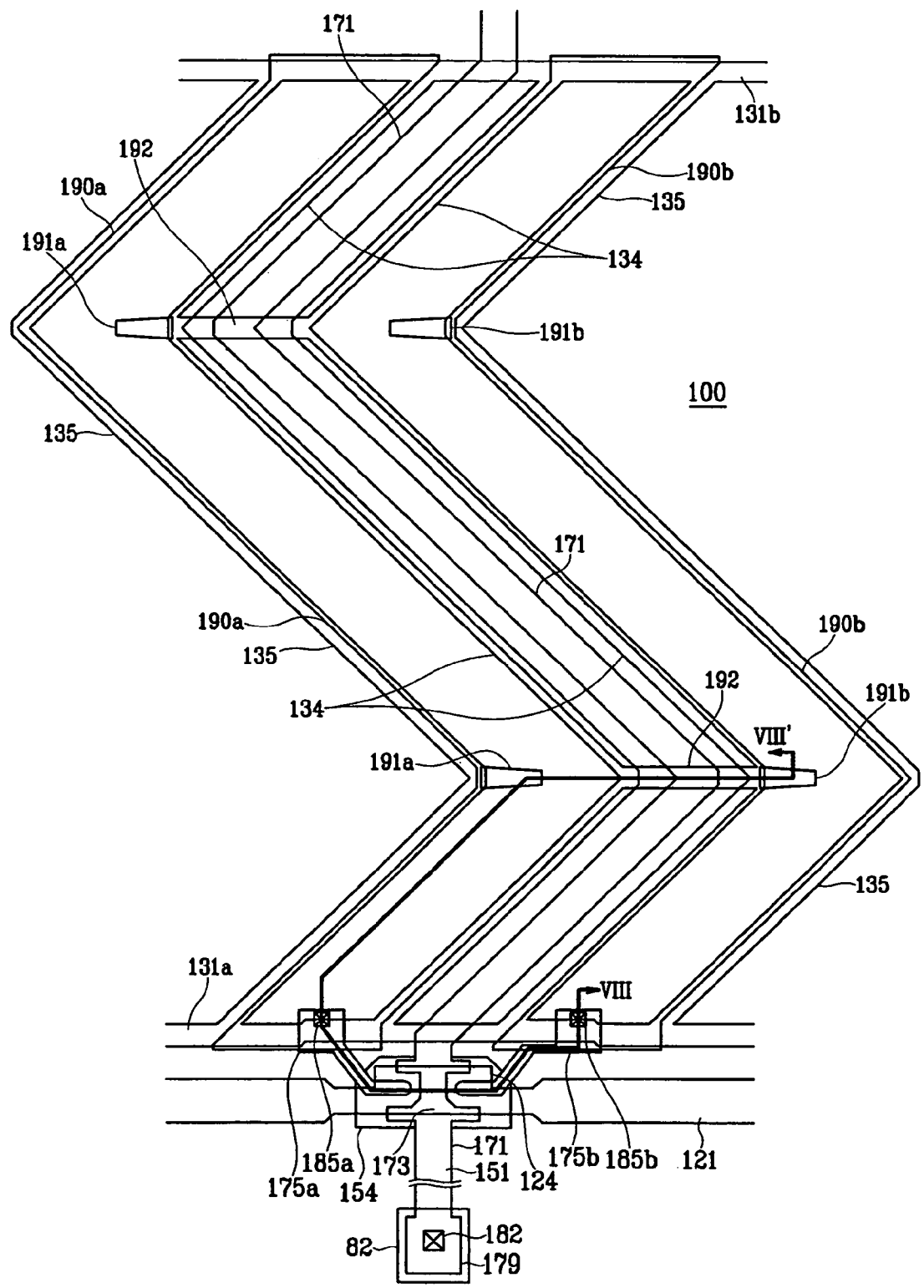
FIG. 7 is a layout view of a TFT array panel for an LCD according to another embodiment of the present invention.
Figure 8:
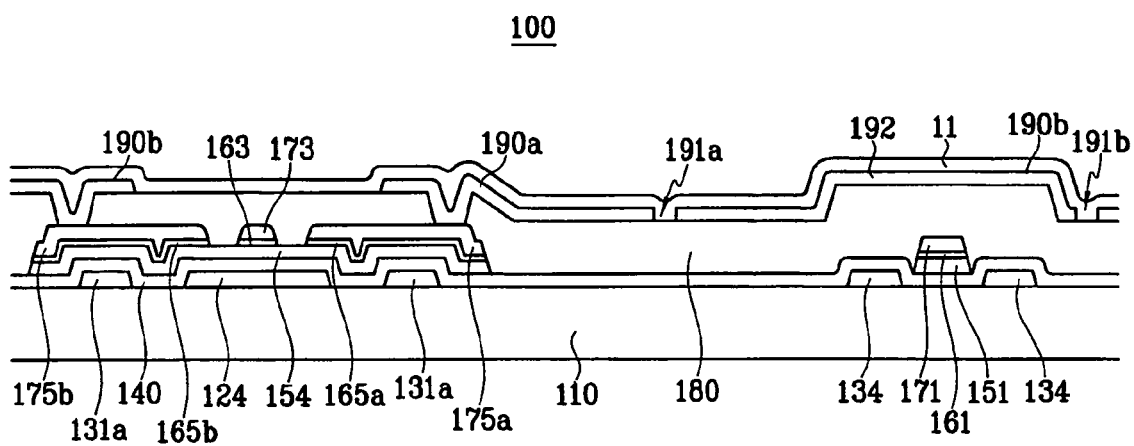
FIG. 8 is a sectional view of the TFT array panel shown in FIG. 7 taken along the line VIII-VIII'.
Figure 9:
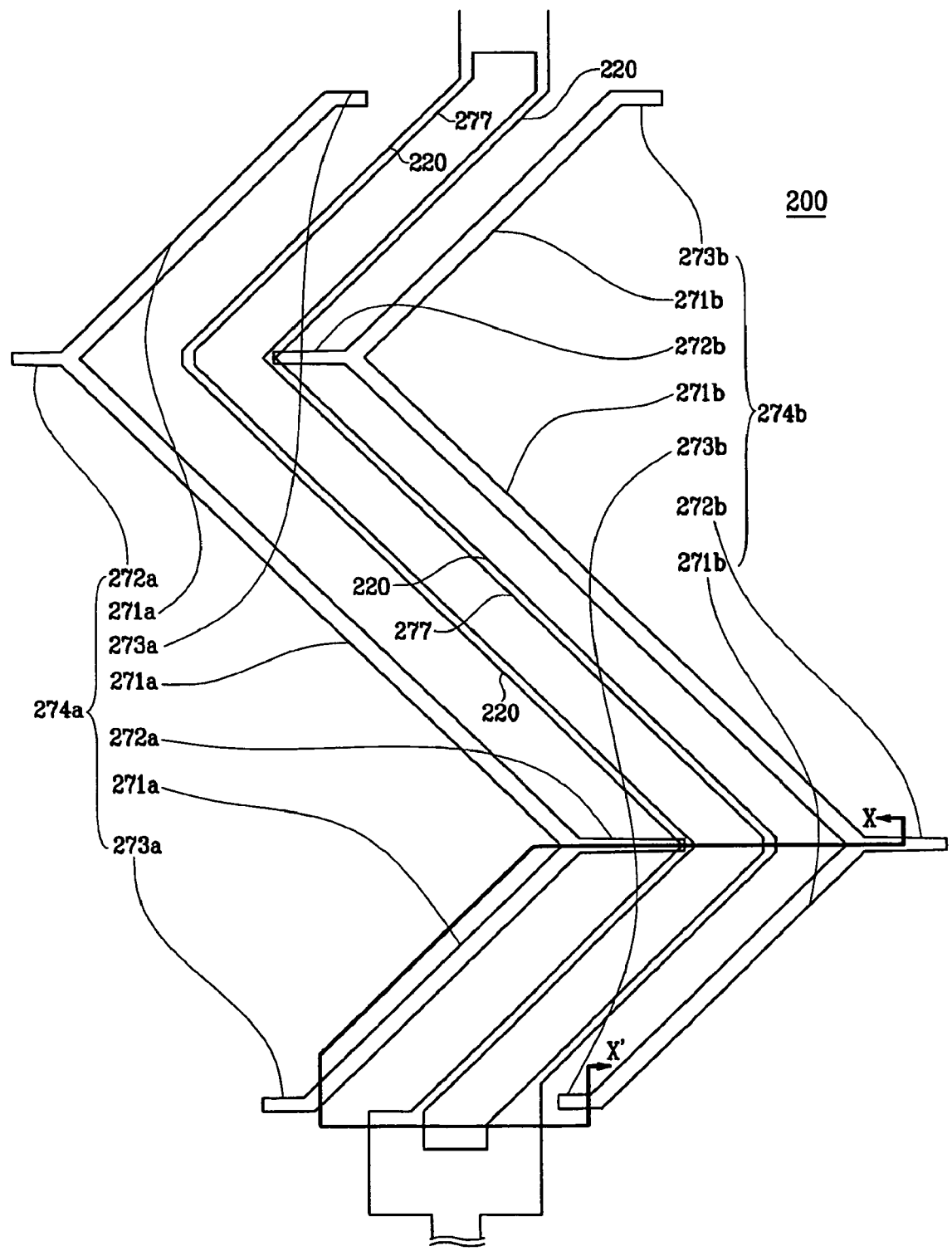
FIG. 9 is a layout view of a common electrode panel for an LCD according to another embodiment of the present invention.
Figure 10:
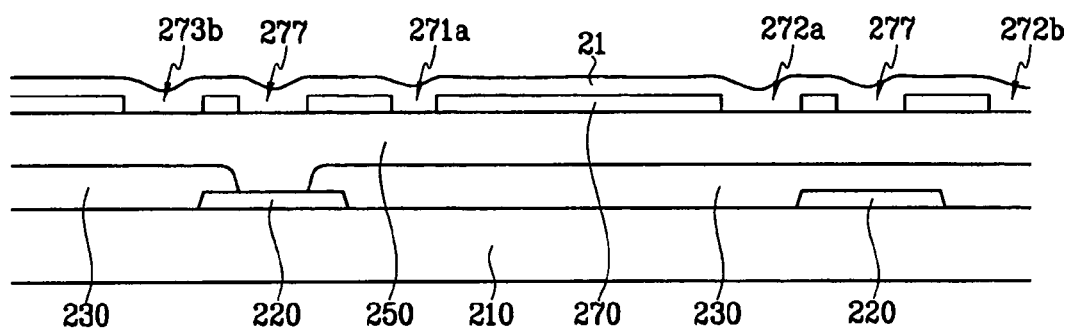
FIG. 10 is a sectional view of the common electrode panel shown in FIG. 9 taken along the line X-X'.

FIG. 7 is a layout view of a TFT array panel for an LCD according to another embodiment of the present invention, FIG. 8 is a sectional view of the TFT array panel shown in FIG. 7 taken along the line VIII-VIII', FIG. 9 is a layout view of a common electrode panel for an LCD according to another embodiment of the present invention, and FIG. 10 is a sectional view of the common electrode panel shown in FIG. 9 taken along the line X-X'.

Referring to FIGS. 7-10, an LCD according to this embodiment includes a TFT array panel 100, a common electrode panel 200, and a LC layer (not shown) interposed therebetween.

Layered structures of the panels 100 and 200 according to this embodiment are almost the same as those shown in FIGS. 1-6.

Regarding the TFT array panel 100 shown in FIGS. 7 and 8, a plurality of gate lines 121 including a plurality of gate electrodes 124 and a plurality of storage electrode lines 131a and 131b including a plurality of storage electrodes 134 and 135 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165a and 165b are sequentially formed thereon. A plurality of data lines 171 including a plurality of source electrodes 173 and a plurality of drain electrodes 175a and 175b are formed on the ohmic contacts 161, 165a and 165b, and a passivation layer 180 is formed thereon. A plurality of contact holes 182, 185a and 185b are provided at the passivation layer 180. A plurality of pixel electrodes 190 including sub-pixel electrodes 190a and 190b having two curved edges and a plurality of contact assistants 82 are formed on the passivation layer 180 and an alignment layer 11 is coated thereon.

Regarding the common electrode panel 200 shown in FIGS. 9 and 10, a light blocking member 220, a plurality of color filters 230, an overcoat 250, a common electrode 270 having cutouts 274a and 274b and openings 277, and an alignment layer 21 are formed on an insulating substrate 210.

Different from the LCD shown in FIGS. 1-6, each of the curved edges of the sub-pixel electrodes 190a and 190b are curved twice to have a pair of convex and concave vertices, and thus the data lines 171, the storage electrodes 134 and 135, the cutouts 274a and 274b and the openings 277 of the common electrode 270, the light blocking member 220, and the color filters 230 are curved twice.

Furthermore, each sub-pixel electrode 190a/190b has a pair of cutouts 191a/191b that are disposed nearly in left and right halves of the sub-pixel electrode 190a/190b and extend substantially from the concave vertices along the transverse direction. Each of the cutouts 274a/274b include a curved portion 271a/271b having two curve points, a pair of intermediate transverse portions 272a/272b extending from the curve points of the curved portion 271a/271b approximately to the convex vertices of the sub-pixel electrodes 190a/190b, and a pair of terminal transverse portions 273a/273b connected to respective ends of the curved portion 271a/271b.

In addition, the semiconductor stripes 151 have almost the same planar shapes as the data lines 171 and the drain electrodes 175a and 175b as well as the underlying ohmic contacts 161, 165a and 165b. However, the projections 154 of the semiconductor stripes 151 include some exposed portions, which are not covered with the data lines 171 and the drain electrodes 175a and 175b, such as portions located between the source electrodes 173 and the drain electrodes 175a and 175b.

A manufacturing method of the TFT array panel according to an embodiment simultaneously forms the data lines 171, the drain electrodes 175a and 175b, the semiconductors 151, and the ohmic contacts 161, 165a and 165b using one photolithography process.

A photoresist pattern for the photolithography process has position-dependent thickness, and in particular, it has first and second portions with decreased thickness. The first portions are located on wire areas that will be occupied by the data lines 171 and the drain electrodes 175a and 175b and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-6 may be appropriate to the LCD shown in FIGS. 7-10.

An LCD according another embodiment of the present invention will be described in detail with reference to FIGS. 11-14.

Figure 11:
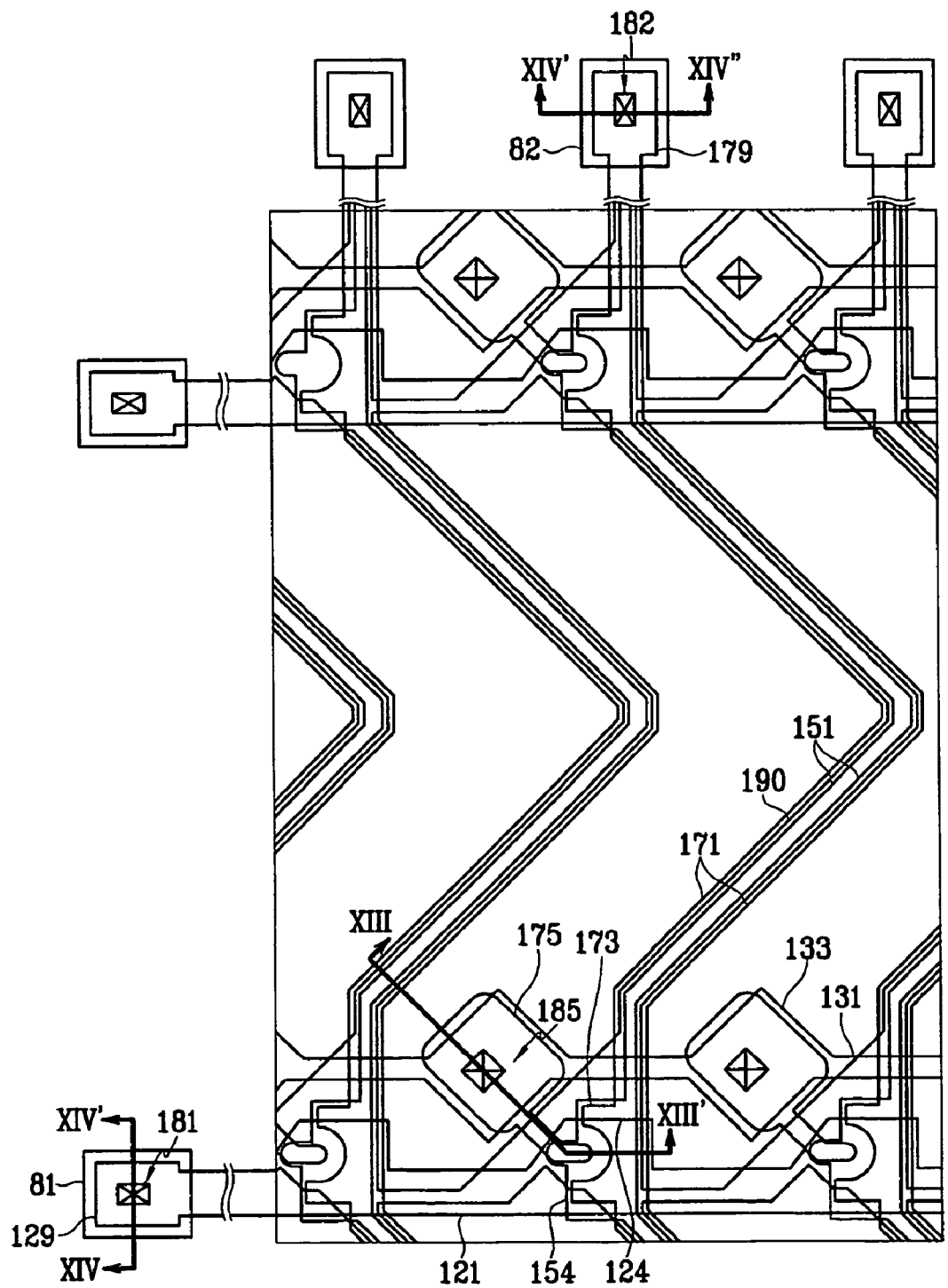
FIG. 11 is a layout view of a TFT array panel for an LCD according to another embodiment of the present invention.
Figure 12:
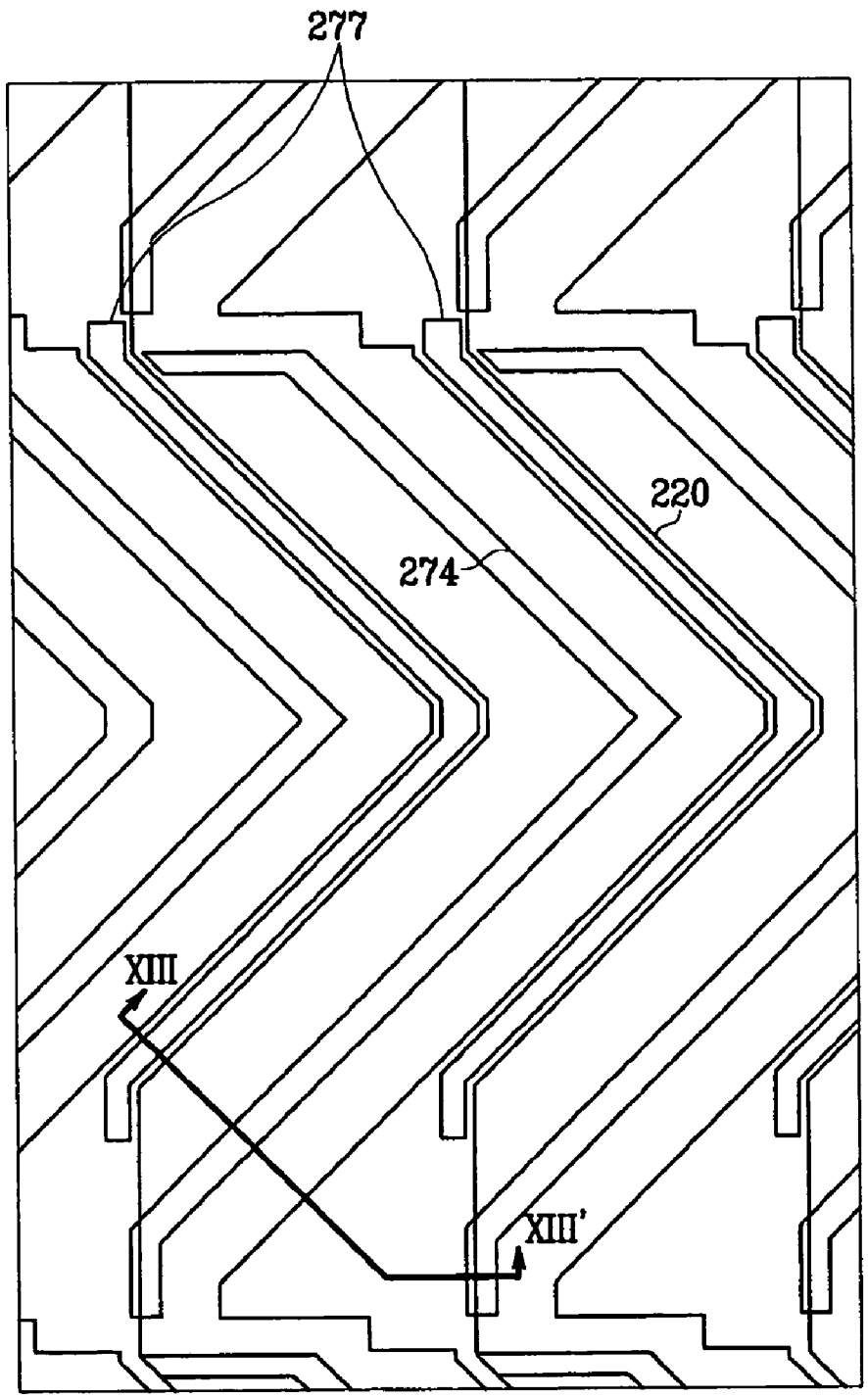
FIG. 12 is a layout view of a common electrode panel for an LCD according to another embodiment of the present invention.
Figure 13:
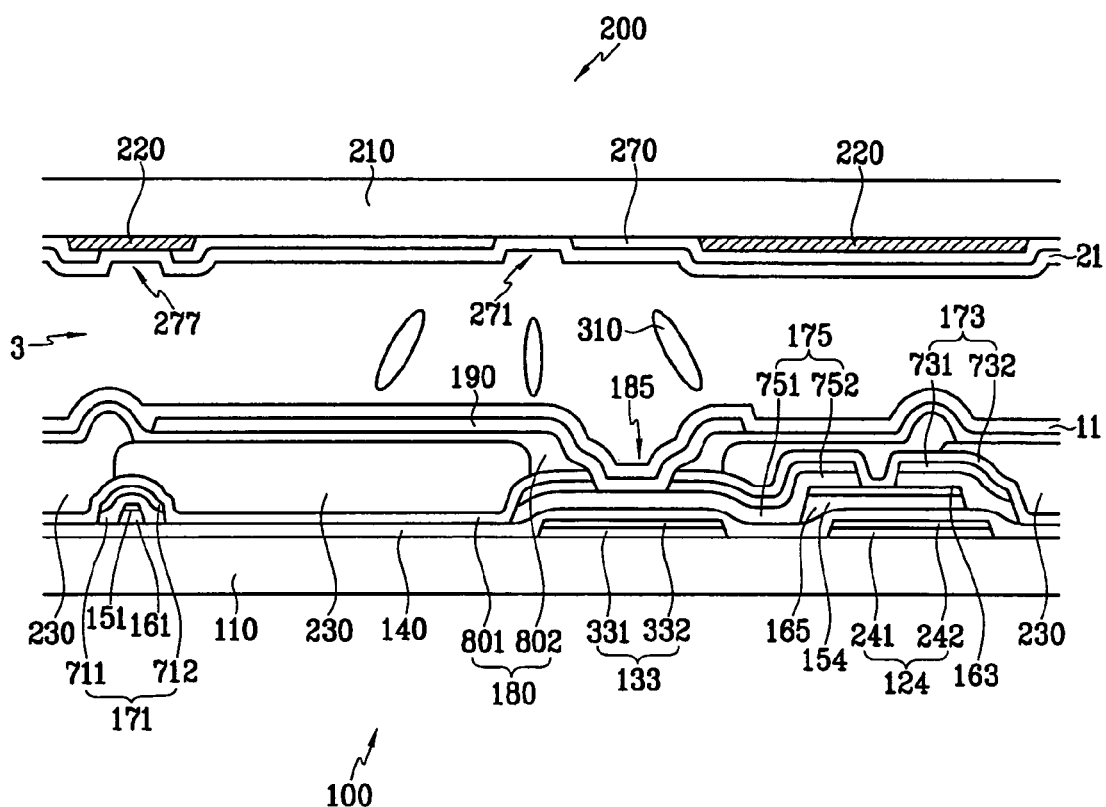
FIG. 13 is a sectional view of an LCD including the TFT array panel shown in FIG. 11 and the common electrode panel shown in FIG. 12 taken along the line XIII-XIII' in FIGS. 11 and 12.
Figure 14:
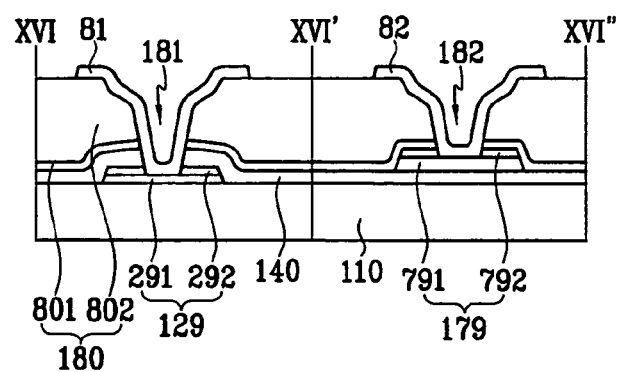
FIG. 14 is a sectional view of an LCD including the TFT array panel shown in FIG. 11 and the common electrode panel shown in FIG. 12 taken along the lines XIV-XIV' and XIV'-XIV'' in FIG. 11.

FIG. 11 is a layout view of a TFT array panel for an LCD according to another embodiment of the present invention, FIG. 12 is a layout view of a common electrode panel for an LCD according to another embodiment of the present invention, FIG. 13 is a sectional view of an LCD including the TFT array panel shown in FIG. 11 and the common electrode panel shown in FIG. 12 taken along the line XIII-XIII' in FIGS. 11 and 12, and FIG. 14 is a sectional view of an LCD including the TFT array panel shown in FIG. 11 and the common electrode panel shown in FIG. 12 taken along the lines XIV-XIV' and XIV'-XIV'' in FIG. 11.

Referring to FIGS. 11-14, an LCD according to this embodiment includes a TFT array panel 100, a common electrode panel 200, and a LC layer 3 interposed therebetween containing a plurality of liquid crystal molecules 310.

Layered structures of the panels 100 and 200 according to this embodiment are almost the same as those shown in FIGS. 1-6.

Referring to the TFT array panel 100, a plurality of gate lines 121 including a plurality of gate electrodes 124 and a plurality of storage electrodes lines 131 are formed on a substrate 110. A gate insulating layer 140, a plurality of semiconductor stripes 151 including a plurality projections 154 and a plurality of ohmic contact islands 163 and 165 are sequentially formed thereon. A plurality of data lines 171 including a plurality of source electrodes 173 and a plurality of drain electrodes 175 are formed on the ohmic contacts 163 and 165, and a passivation layer 180 is formed thereon. A plurality of contact holes 182 and 185 are provided at the passivation layer 180, and a plurality of pixel electrodes 190 and a plurality of contact assistants 82 are formed on the passivation layer 180. Finally, an alignment layer 11 is formed on the pixel electrodes 190 and the passivation layer 180.

Referring to the common electrode panel 200, a light blocking member 220 and a common electrode 270 as well as an alignment layer 21 are sequentially formed on an insulating substrate 210.

Different from the TFT array panel shown in FIGS. 1-6, the pixel electrodes 190 include no sub-pixel electrode and no cutout. Furthermore, each pixel electrode 190 is enclosed by a pair of adjacent data lines 171 and a pair of adjacent gate lines 121, and a pair of a gate line 121 and a data line 171 define only one TFT located near a corner of a pixel electrode 190. There is only one storage electrode line 131 disposed between adjacent two gate lines 121 and the storage electrode line 131 may be substantially equidistant from the adjacent two gate lines 121. The storage electrode lines 131 include a plurality of expansions 133 instead of the linear storage electrodes (134 and 135 shown in FIG. 1), which have a shape of a diamond or a rectangle rotated by about 45 degrees according to the shape of the pixel electrodes 190. Likewise, the expansions of the drain electrodes 175 follow the shape of the expansions of the expansions 133 of the storage electrode lines 131. The pixel electrodes 190 overlap the gate lines 121 with crossing over the storage electrode lines 131, thereby increasing the aperture ratio.

The common electrode 270 has a plurality of cutouts 274 facing respective pixel electrodes 190 and a plurality of openings 277 facing the data lines 171. Only one cutout 274 is provided between adjacent two of the openings 277 and each cutout 274 bisects the pixel electrode 190. Each cutout 274 has a curved portion, a terminal transverse portion connected to an end of the curved portion, and a longitudinal portions connected to the other end of the curved portion, but it has no center transverse portion and another terminal transverse portion shown in FIG. 2.

Each gate line 121 includes an expanded end portion 129 for contact with another layer or an external device. Therefore, a plurality of contact holes 181 are provided at the passivation layer 180 and the gate insulating layer 140, and a plurality of contact assistants 81 connected to the end portions 129 through the contact holes 181 are formed on the passivation layer 180.

Furthermore, the gate lines 121, the storage electrode lines 131, the data lines 171, and the drain electrodes 175 include upper films preferably made of low resistivity metal including Al containing metal, Ag containing metal, or Cu containing metal for reducing signal delay or voltage drop, and lower films preferably made of material such as Cr, Mo, Mo alloy, Ta, or Ti, which has good physical, chemical, and electrical contact characteristics with other materials such as indium tin oxide (ITO) or indium zinc oxide (IZO). In FIGS. 13 and 14, the lower and the upper films of the gate electrodes 124 are indicated by reference numerals 241 and 242, respectively, the lower and the upper films of the end portions 129 are indicated by reference numerals 291 and 292, respectively, the lower and the upper films of the storage electrodes 133 are indicated by reference numerals 331 and 332, respectively, the lower and the upper films of the data lines 171 are indicated by reference numerals 711 and 712, respectively, the lower and the upper films of the source electrodes 173 are indicated by reference numerals 731 and 732, respectively, the lower and the upper films of the drain electrodes 175 are indicated by reference numerals 751 and 752, respectively, and the lower and the upper films of the end portions 179 of the data lines 171 are indicated by reference numerals 791 and 792, respectively. Portions of the upper films 292, 792 and 752 of the end portions 129 and 179 and the drain electrodes 175 are removed to expose the underlying portions of the lower films 291, 791 and 751.

The passivation layer 180 includes a lower insulating film 801 and an upper insulating film 802. The lower insulating film 801 is preferably made of inorganic insulator such as silicon nitride, and the upper insulating film 802 is preferably made of photosensitive organic material. The upper insulating film 802 prevents the color filters 230 from being exposed to contaminate the LC layer 3 and it may be omitted when the color filters 230 hardly emit impurity such as color agents. The upper insulating film 802 may be made of inorganic insulator such as silicon nitride and silicon oxide and the lower insulating may be omitted.

In addition, a plurality of red, green and blue color filters 230 are formed between the lower insulating film 801 and the upper insulating film 802. Instead, there is no color filter and no overcoat on the common electrode panel 200. The color filters 230 follow the shape of the pixel electrodes 190 and the color filters 230 in adjacent two data lines 171 and arranged in the longitudinal direction may be connected to each other to form a periodically curved stripe. Neighboring color filters 230 overlap each other on the data lines 171 to enhance the prevention of light leakage between the pixel electrodes 190. The overlapping portions of the color filters 230 form hills extending along the data lines 171 and the upper insulating film 802 protrudes upward on the hills formed by the color filters 230 such that the protrusions of the upper insulating layer 802 enhance the control of the tilt directions of the LC molecules 310 in the LC layer 3.

The color filters 230 have a plurality of openings disposed on the drain electrodes 175, which expose the contact holes 185 and a top surface of the lower insulating film 801. The color filters 230 are not provided on a peripheral area which is provided with the expansions 129 and 179 of the gate lines 121 and the data lines 179.

Since the color filters 230 and the pixel electrodes 190 are provided on the TFT array panel 100, the LCD shown in FIGS. 11-14 may have a large alignment margin for aligning the TFT array panel 100 and the common electrode panel 200.

Many of the above-described features of the LCD shown in FIGS. 1-6 may be appropriate to the LCD shown in FIGS. 11-14.

As described above, the openings provided at the common electrode reduce the delay of the data voltages flowing in the data lines, which is generated by the parasitic capacitance formed by the overlap of the common electrode and the data lines. The openings also decrease the variation of the capacitance of the liquid crystal capacitor due to the data voltages carried by the data lines and lateral light leakage due to the crosstalk of the data signals. The reduction of the lateral light leakage enables to decrease the width of the light blocking member, thereby increasing the aperture ratio.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
    a first substrate;
    a first signal line formed on the first substrate and extending in a first direction;
    a second signal line formed on the first substrate and including a curved portion and a rectilinear portion connected to the curved portion, wherein the rectilinear portion intersects the first signal line and the second signal line is a data line;
    a first thin film transistor connected to the first signal line and the second signal line;
    a pixel electrode connected to the first thin film transistor;
    a second substrate facing the first substrate;
    a common electrode formed on the second substrate, the common electrode comprising an opening facing the second signal line, the opening extending in a lengthwise direction of the second signal line and parallel with the second signal line and including a curved portion which is a same shape as that of the second signal line; and
    a third signal line overlapping the pixel electrode, extending substantially parallel to the first signal line, and separated from the first signal line wherein the thin film transistor comprises a terminal connected to the pixel electrode and overlapping the third signal line, wherein the third signal line comprises a first curved branch extending substantially parallel to the curved portion of the second signal line.

2. The liquid crystal display of claim 1, wherein the pixel electrode comprises at least two sub-pixel electrodes and at least one of the sub-pixel electrodes is connected to the first thin film transistor.

3. The liquid crystal display of claim 2, wherein the sub-pixel electrodes comprise first and second sub-pixel electrodes disposed opposite each other with respect to the second signal line.

4. The liquid crystal display of claim 3, further comprising a second thin film transistor connected to the first and the second signal lines and the second sub-pixel electrode, wherein the first sub-pixel electrode is connected to the first thin film transistor.

5. The liquid crystal display of claim 4, wherein the third signal line further comprises a second curved branch extending substantially parallel to the curved portion of the second signal line, wherein the first and the second branches of the third signal line are disposed opposite each other with respect to the second signal line.

6. The liquid crystal display of claim 5, wherein the first and the second branches of the third signal line overlap the first and the second sub-pixel electrodes, respectively.

7. The liquid crystal display of claim 6, wherein the first and the second sub-pixel electrodes comprise edges disposed on the first and the second curved branches of the third signal line, respectively.

8. The liquid crystal display of claim 7, wherein the opening has an edge disposed between an edge of the second signal line and an edge of the first or the second branch of the third signal line adjacent thereto.

9. The liquid crystal display of claim 8, wherein the first and the second sub-pixel electrodes are connected to each other.

10. The liquid crystal display of claim 9, wherein the pixel electrode further comprises a pixel connection connecting the first and the second sub-pixel electrodes and intersecting the curved portion of the second signal line.

11. The liquid crystal display of claim 1, wherein the curved portion of the second signal line comprises at least two rectilinear portions alternately making clockwise and counterclockwise angles of about 45 degrees.

12. The liquid crystal display of claim 1, further comprising a tilt direction determining member disposed on the first or the second substrate and including a curved portion.

13. The liquid crystal display of claim 12, wherein the tilt direction determining member includes a cutout provided at the pixel electrode or the common electrode.

14. The liquid crystal display of claim 12, wherein the tilt direction determining member includes a protrusion provided on the pixel electrode or the common electrode.

* * * * *